United States Patent

Bolen et al.

[11] Patent Number: 6,059,590
[45] Date of Patent: May 9, 2000

[54] CLOCKSPRING TAMPER PROOF EXTERNAL LOCK

[75] Inventors: Patrick Bolen, Carthage; Brent A. Moormann, Bowen, both of Ill.

[73] Assignee: Methode Electronics, Inc., Chicago, Ill.

[21] Appl. No.: 09/289,069

[22] Filed: Apr. 8, 1999

[51] Int. Cl.[7] ................................................. H01R 35/04
[52] U.S. Cl. .............................................. 439/164; 439/15
[58] Field of Search ....................................... 439/164, 15

[56] References Cited

U.S. PATENT DOCUMENTS

| | | | |
|---|---|---|---|
| 4,722,690 | 2/1988 | Priede | 439/15 |
| 4,886,460 | 12/1989 | Olgren | 439/15 |
| 5,171,157 | 12/1992 | Bolen | 439/164 |
| 5,460,535 | 10/1995 | Bolen | 439/164 |
| 5,785,541 | 7/1998 | Best et al. | 439/164 |
| 5,871,366 | 2/1999 | Nishikigi et al. | 439/164 |

FOREIGN PATENT DOCUMENTS

| | | |
|---|---|---|
| 0195833 | 9/1988 | European Pat. Off. . |
| 0195831 | 6/1989 | European Pat. Off. . |
| 2 250 146A | 6/1991 | United Kingdom . |

*Primary Examiner*—Gary F. Paumen
*Attorney, Agent, or Firm*—Karl D. Kovach; David L. Newman

[57] ABSTRACT

An external locking clockspring assembly including a housing and a hub rotatably mounted in the housing. The housing having a first keyway. The hub having a second keyway. The first and second keyways being substantially coaxial in a locked position of the external clockspring assembly. A key insertable into both the first and second keyways. The key having a flexible tab. The hub having an indentation which is complementary to the flexible tab of the key when the flexible tab of the key is in a non-deformed state. An insertion tool is used to deflect the flexible tab of the key so that the key can be inserted into the first and second keyways. Upon insertion of the key into the first and second keyways, the flexible tab expands toward its undeflected position so as to engage the indentation of the second keyway of the hub. The engagement of the key with the second keyway prevents the key from falling out of the first and second keyways. The key has an extension which engages the first keyway of the housing when the key is in the locked position. The mutual engagement of the key with the first keyway of the housing and the engagement of the key with the second keyway of the hub prevents the hub from rotating relative to the housing.

20 Claims, 19 Drawing Sheets

CLOCKSPRING TAMPER PROOF EXTERNAL LOCK

BACKGROUND OF THE INVENTION

1. Field of the Invention

The present invention pertains to a locking device. The invention more particularly concerns the external locking of a hub to a housing of an automotive clockspring.

2. Discussion of the Background

Devices are well known in the art for locking a hub to a housing of an automobile clockspring. An automotive clockspring is an electrical connector which electrically connects a rotatable airbag assembly mounted on the steering column to stationary crash sensors located elsewhere on the vehicle. An automotive clockspring typically includes a housing and a cover mounted to the housing so as to form a cavity therebetween. Rotatably mounted within the cavity is a hub. The clockspring housing is non-rotatably mounted to the steering column, while the hub is attached to the rotatable airbag assembly. Electrical cable is wound around the hub. One end of the electrical cable terminates at the stationary housing or cover and the other end terminates at the hub. The end of the electrical cable terminated at the hub is then connected to an electrical cable which connects to the airbag assembly. During use, the electrical cable is either spooled or un-spooled around the hub when the steering wheel is turned in one direction or the other direction.

When the clockspring is assembled to the steering column of the vehicle, the vehicle typically has its wheels in a neutral position, i.e., the wheels are in a straight forward position, not turned right or left. Thus, it is critical that the hub of the clockspring is rotationally positioned relative to the housing in a such a position that the hub is able to rotate in either direction in equal amounts. That is, the hub must be at its center or mid-span of travel position. Otherwise, if the clockspring is assembled to a vehicle where the hub has been pre-rotated a few rotations or degrees from center, then when the operator of the vehicle turns the steering wheel as far as possible in the one direction, the electrical cable coiled around the hub will be pulled out of the hub or the housing, the electrical cable will rupture, or the electrical cable will have its cross-sectional area reduced due to the applied tensile force, thus reducing its ability to properly carry the electrical signal. Therefore, the critical electrical connection between the airbag assembly and the stationary crash sensors would be lost.

One prior art solution was to have the assembly-person rotate the hub through all of the travel from one end of travel to the other end of travel. Then, the assembly-person would back off, or rotate, the hub away from one of the ends of travel by an amount equal to one half of the total number of rotations of full travel. Thus, the clockspring would be at its center or mid-span of travel position. At such a time, the assembly-person would mount the clockspring onto the steering column. Over time, labor cost became so high that the amount of time required to perform the assembly operation described above became prohibitive.

Due to the high labor costs, the automotive manufacturers required suppliers of clocksprings to deliver clocksprings that had hubs locked at the center or mid-span travel position relative to the housing. As such, a clockspring could be taken out of inventory and directly mounted to the steering column.

One prior art solution, known as an internal locking clockspring assembly, is exemplified by U.S. Pat. Nos. 4,886,460, 5,460,535, and 5,171,157; U.K. Patent Application No. GB 2250146; and European Patent Application No. 0195833. A common feature of these references is that they all lock the hub to the housing of the clockspring by way of parts or mechanisms forever or integrally attached to the clockspring. The internal locking clockspring assembly remains locked before installation, becomes unlocked when installed, and, typically, becomes locked again when removed from the steering column, such as for repair work. The internally locking clockspring assemblies perform adequately, but, due to the number of parts required to make the mechanism work properly, the cost, size, and weight of such clocksprings are relatively high. Thus, there is a need for an inexpensive, locking clockspring which is small and light in weight.

Another prior art solution, known as an externally locking clockspring assembly, is exemplified by U.S. Pat. No. 4,722,690, and European patent Application No. 0195831. A common feature of these references is that they all lock the hub to the housing of the clockspring by way of parts or mechanisms removable from the clockspring. The externally locking clockspring assemblies remain locked before installation. Then, just before or just after being installed onto the steering column, a removable locking part, device, or mechanism is removed from the clockspring, thus allowing the hub of the clockspring to rotate relative to the housing of the clockspring. The removable locking device is typically discarded.

An advantage of the externally locking clockspring assembly is that the external locking device does not take up valuable space when the clockspring is assembled on the steering column. Furthermore, the external locking device does not add weight to the clockspring since the external locking device is removed from the clockspring. Another advantage of the external locking clockspring is that it is relatively inexpensive, since it does not have as many parts as the internally locking clockspring assembly.

A disadvantage of external locking clocksprings is that the removable external locking device can be removed, the hub rotated away from center, and then the external locking device can be re-attached to the clockspring, resulting in a tampered clockspring. If a tampered clockspring is assembled on a vehicle, the clockspring may fail to properly conduct the electrical signal as described above. Such problems exist with one type of clockspring where the external locking device is a label or seal which attaches to part of the hub and to part of the housing. When the seal is removed, the hub can rotate. However, the seal can also be re-applied to the hub and housing after tampering with the clockspring. Additionally, European Patent Application No. 0195831 discloses an external locking device which includes a cup-shaped lock having a notched projection and a clip pin which engage the hub and the housing of the clockspring to prevent rotation therebetween. This reference fails also because the external locking device can be re-installed on the clockspring after tampering with the clockspring with no visible notice of tampering of the clockspring to the person installing the clockspring onto the steering column. Thus, there is a need for an external locking clockspring assembly where the external locking device can not be re-installed without indicating a notice of tampering or that only a person of authority be capable of re-installing the external locking device.

U.S. Pat. No. 4,722,690 discloses an external locking device which takes the form of a tab molded to the housing where the tab prevents the hub from rotating. The tab is connected to the housing via perforations. To allow rotation of the hub, the tab is removed from the housing. The structure of the tab prevents it from being re-attached to the housing. Thus, once the tab is removed, the clockspring must be mounted to the steering column or be discarded. Therefore, the externally locking clockspring assembly of U.S. Pat. No. 4,722,690 provides notice of tampering, however, the clockspring of U.S. Pat. No. 4,722,690 can not be salvaged or re-used if one of the clocksprings is taken from inventory and inspected for compliance to requirements of being positioned at the mid-span of travel or if the tab is inadvertently removed. Thus, there is a need for an externally locking clockspring which can have the external locking device re-installed in the clockspring provided the external locking device is re-installed by a person possessing the required skill, knowldege, and authority. Such re-intsallation is necessary after an external locking device is removed from a clockspring taken from inventory, where the clockspring is inspected for compliance with requirements, or after an external locking device has been inadvertently removed from the clockspring and needs to be re-installed, or after a clockspring has been removed from the steering column when repairs are made to the steering column.

Thus, there is a need for an inexpensive, reliable, small, external locking clockspring assembly which has an external locking device which can be re-installed under controlled conditions.

SUMMARY OF THE INVENTION

Therefore, it is an object of the present invention to provide an externally locking clockspring assembly having a small size, few number of parts, light in weight, and inexpensive to produce. It is a further object of the invention to prevent the external locking device from being re-installed in the clockspring once it has been removed from the clockspring, unless the external locking device is re-installed by a person having the authority to do so.

In one form of the invention, the external locking clockspring assembly includes a housing and a hub rotatably mounted in the housing. The housing has a first keyway. The hub has a second keyway. A key is included where the key is insertable into both of the first and second keyways. The key has a flexible tab which is engageable with the hub. The key is the external locking device. In a locked position the first keyway is substantially coaxial with the second keyway, and the key is inserted into both the first and second keyways, and the flexible tab engages the hub.

In another form of the invention the above described external locking clockspring includes an insertion tool for deflecting the flexible tab of the key for making insertable the key into both the first and second keyways so that the external locking clockspring is in the locked position.

In still another form of the invention a method is set forth for assembling the external locking clockspring assembly which includes the steps of mounting a hub in a housing, where the housing has a first keyway and the hub has a second keyway. Then, the next step includes rotating the hub relative to the housing so as to align the second keyway with the first keyway so that the first and second keyways are substantially coaxial. Then, in order to lock the hub to the housing, the next step includes deflecting a flexible tab of the key with an insertion tool. The insertion tool contacts the flexible tab at a vertex of the flexible tab. At which time the key is ready for the step of inserting the key into both the first keyway and the second keyway and so as to make the flexible tab engage the hub.

Thus, Applicants' invention is superior to the prior art. Applicants' invention provides a external locking clockspring assembly which reduces the number of part, cost, and size of the clockspring assembly, while allowing the external locking device, the key, to be re-installed by one possessing the authority to do so. Such a person has possession of the tool used to deflect the flexible tab on the key. Therefore, the cost, size, weight and complexity of manufacturing the clocksprings is reduced and the reliability is increased. These and other features of the invention are set forth below in the following detailed description of the presently preferred embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Figure 1:
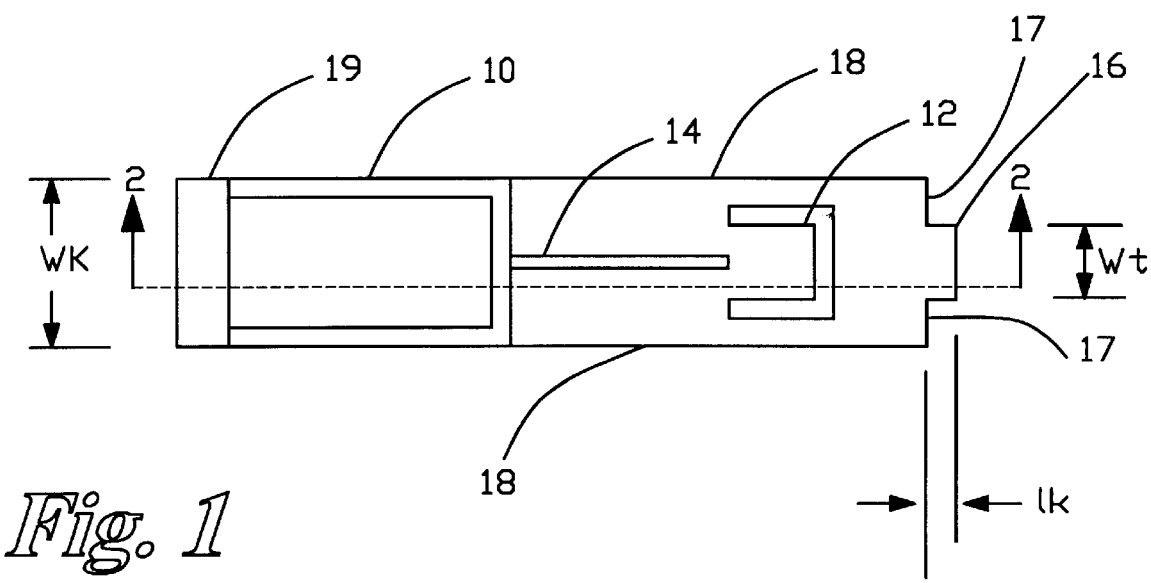
FIG. 1 is a top view of a key of an externally locking clockspring assembly of the present invention.

Referring now to the drawings, wherein like reference numerals designate identical or corresponding parts throughout the several views, and more particularly to FIGS. 1–19 thereof, a first embodiment of the present invention is an externally locking clockspring assembly 1 having a key 10, a hub 20, a housing 30, and a cover 40, as displayed in FIGS. 4–8.

FIG. 1 is a top view of a key 10. The key 10 includes a flexible tab 12, a rib 14, an extension 16, shoulders 17, side portions 18, and a grip 19. The key 10 has a width wk, and the extension 16 of the key 10 has a width wt. Furthermore, the extension 16 has a length lk.

Figure 2:
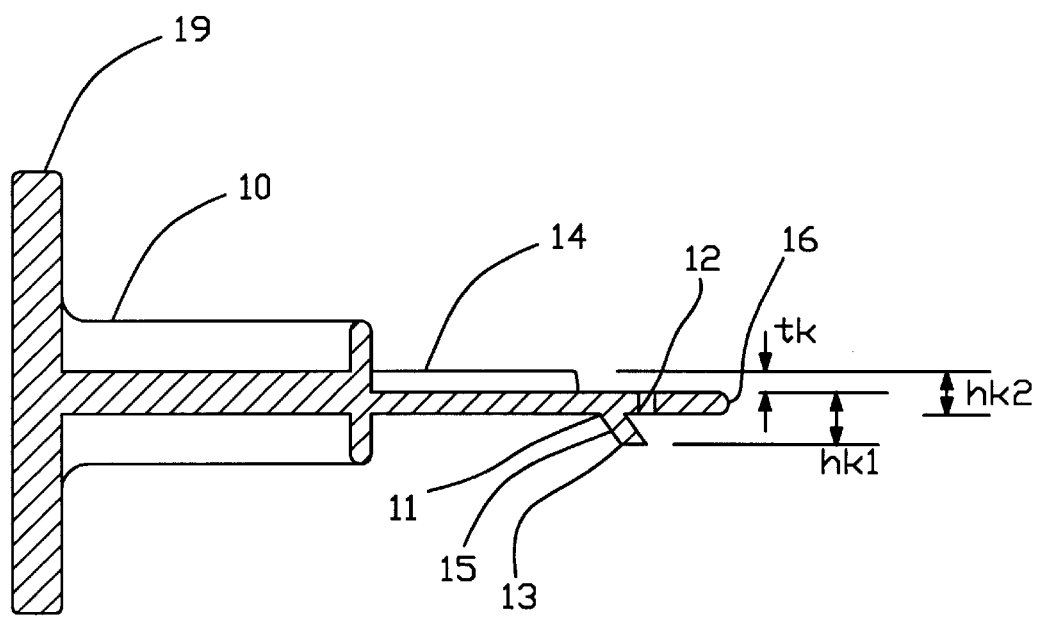
FIG. 2 is a cross-sectional view of the key taken along section line 2—2 of FIG. 1.

FIG. 2 is a cross-sectional view of the key 10 taken along section line 2—2 of FIG. 1. FIG. 2 further displays the grip 19, the rib 14, the extension 16, and introduces a protrusion 13 on the flexible tab 12. The protrusion 13 is shown to have a sloping surface 15 and a vertex 11. The key 10 is made of an elastic material such as a polymer so that the flexible tab 12 can deflect elastically and as such it acts as a resilient spring. However, any attachment or spring can be connected to the key 10 to serve the same purpose as the flexible tab 12 described herein. In contrast, however, other portions of the key 10 are stiff enough so that the other portions of the key 10 are substantially rigid. In order to make the other portions of the key 10 substantially rigid, the rib 14 is included so as to provide a relatively large area moment of inertia which reacts bending moments. Therefore, when the flexible tab 12 deflects, the rest of the key 10 does not deflect substantially.

As shown in FIG. 2, the flexible tab 12 has a height hk1, and the rib 14 has a height hk2. The heights hk1 and hk2 are substantially the same. Also shown is a thickness tk of the extension 16 of the key 10.

Figure 3:
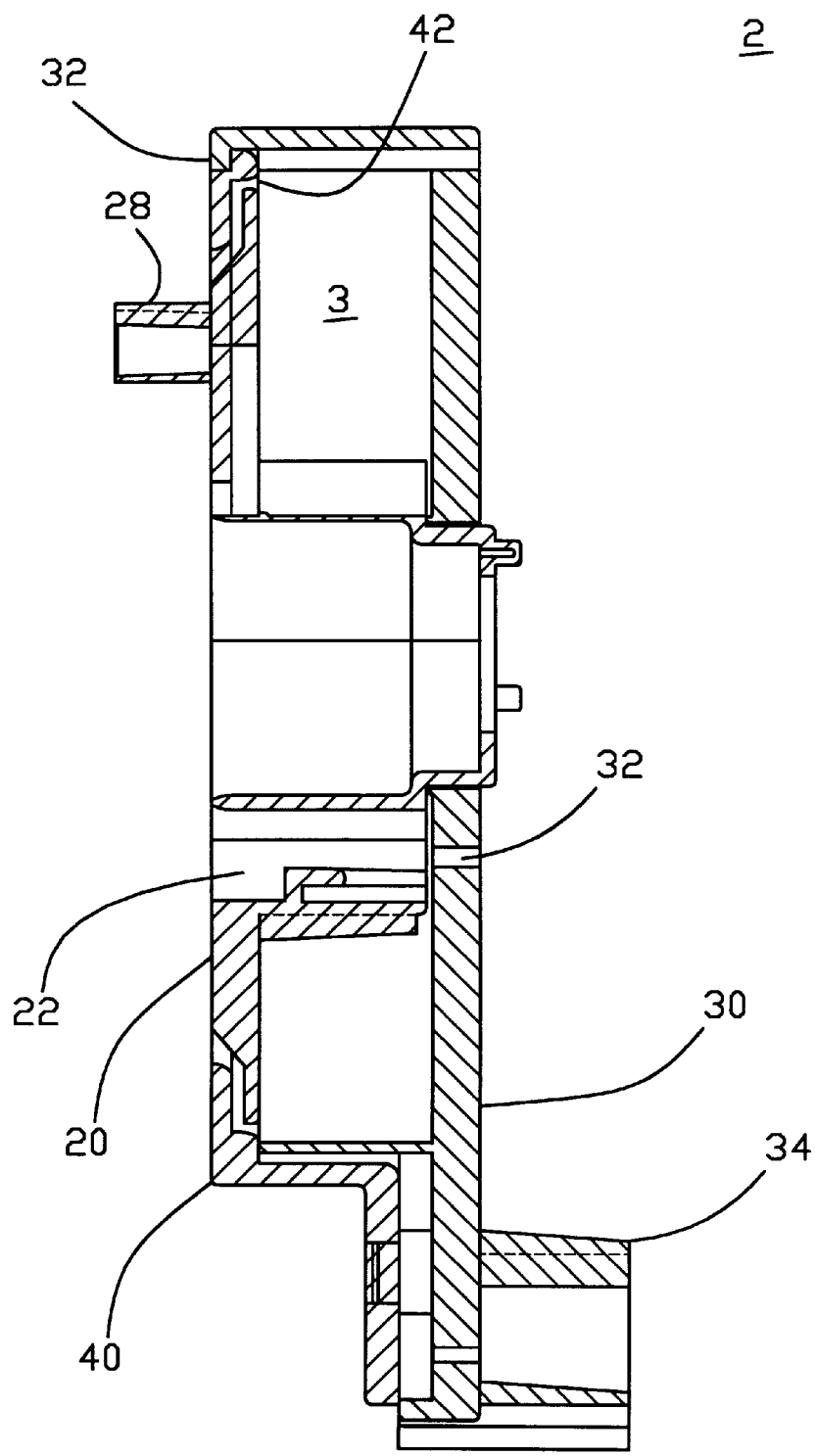
FIG. 3 is a cross-sectional side view of an assembled hub, cover and housing forming the clockspring of the externally locking clockspring assembly of the present invention.

FIG. 3 is a cross-sectional side view of an assembly of the hub 20, housing 30, and cover 40 which form the main components of a clockspring 2. FIG. 3 further shows a first keyway 32 of the cover 30, and a second keyway 22 of the hub 20. Not shown is an electrical cable which is coiled around the hub 20. The electrical cable terminates at one end to a hub terminal 28 and at the other end to a housing terminal 34. FIG. 3 further shows the attachment of the cover 40 to the housing 30 by way of mounting fingers 36 of the housing 30 surrounding and trapping mounting surfaces 42 of the cover 40. The hub 20 is contained within a cavity 3 formed between the cover 40 and the housing 30. The hub 20 is free to rotate within the cavity 3.

Figure 8:
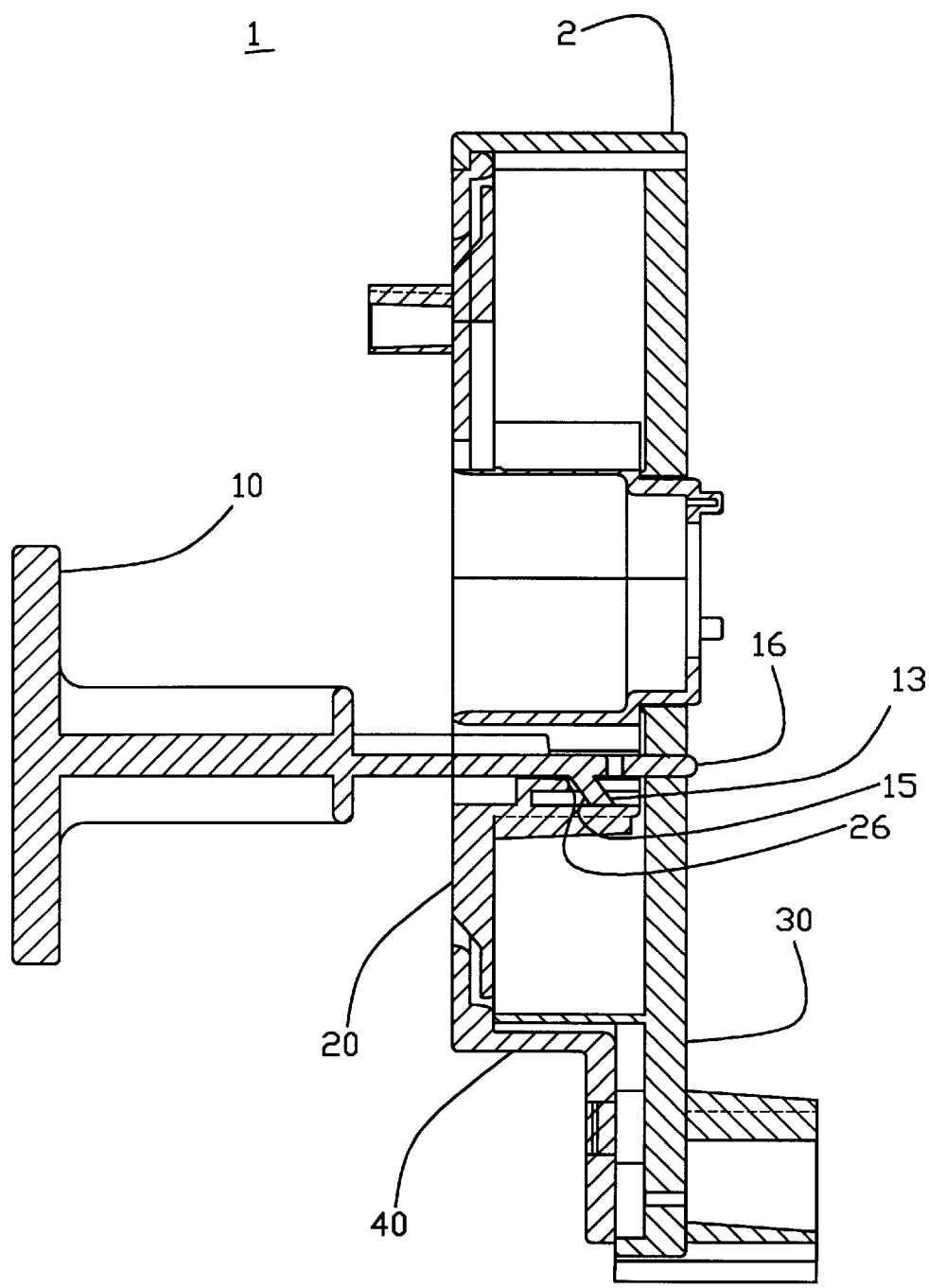
FIG. 8 is a cross-sectional side view of the externally locking clockspring assembly in the locked position.

In practice, the key 10 is inserted into the clockspring 2 so as to form the external locking clockspring assembly 1 (see FIG. 8). The key 10 ensures that the hub 20 does not rotate relative to the housing 30. Furthermore, the key 10 is designed so as not to fall out of the clockspring 2 on its own as discussed herein. Additionally, the key 10 can only be inserted with the use of a special insertion tool as is discussed herein.

Figures 4A, 4B:
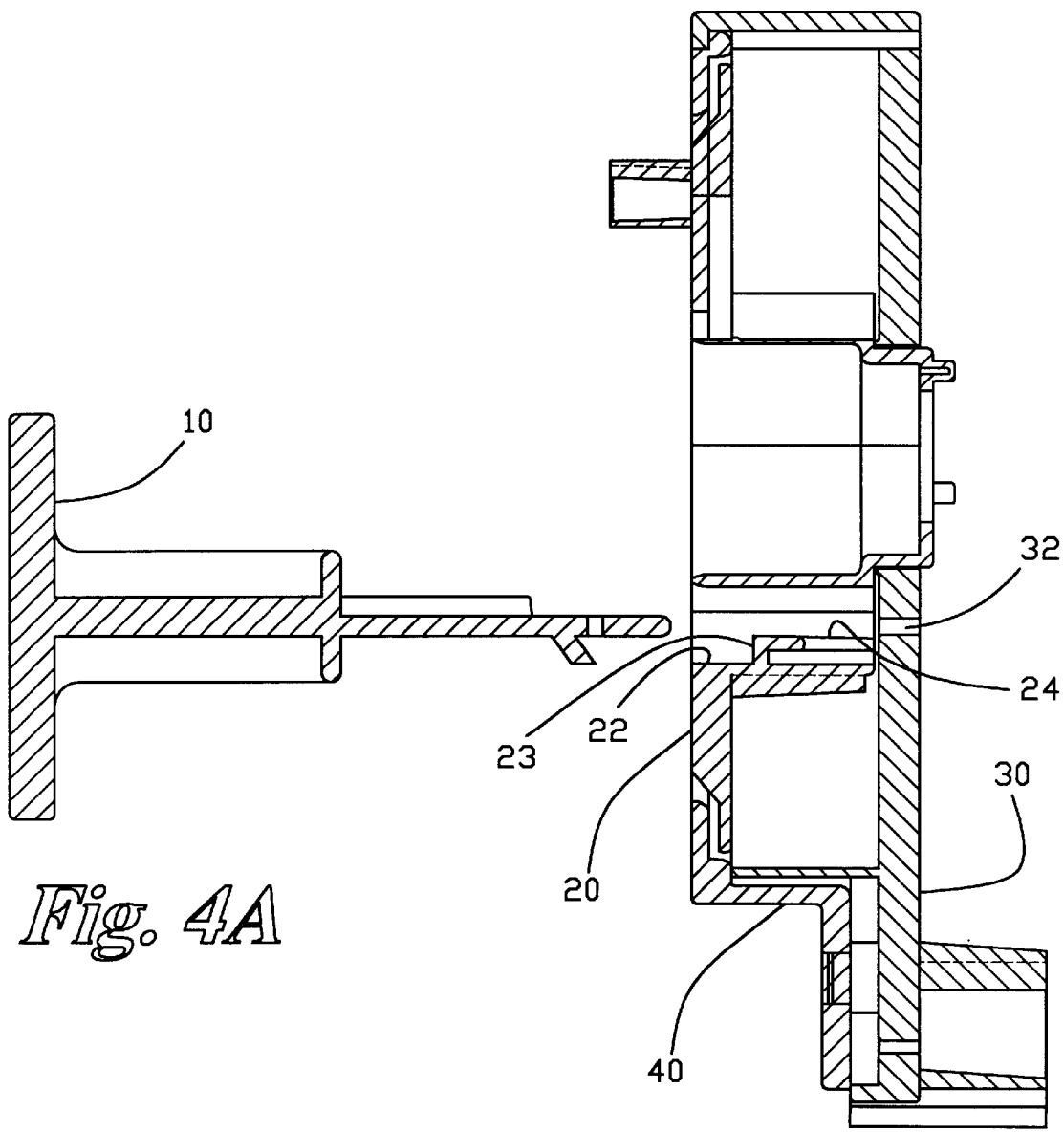
FIGS. 4A and 4B are cross-sectional side views of the key, housing, cover, and hub, where the key is about to enter the clockspring.

FIGS. 4A and 4B are cross-sectional side views showing the key 10 being introduced into the clockspring assembly 2 of the hub 20, housing 30, and cover 40 as discussed in regard to FIG. 3. The key 10 is designed to be inserted into both the second keyway 22 of the hub 20 and the first keyway 32 of the housing 30.

Figure 5:
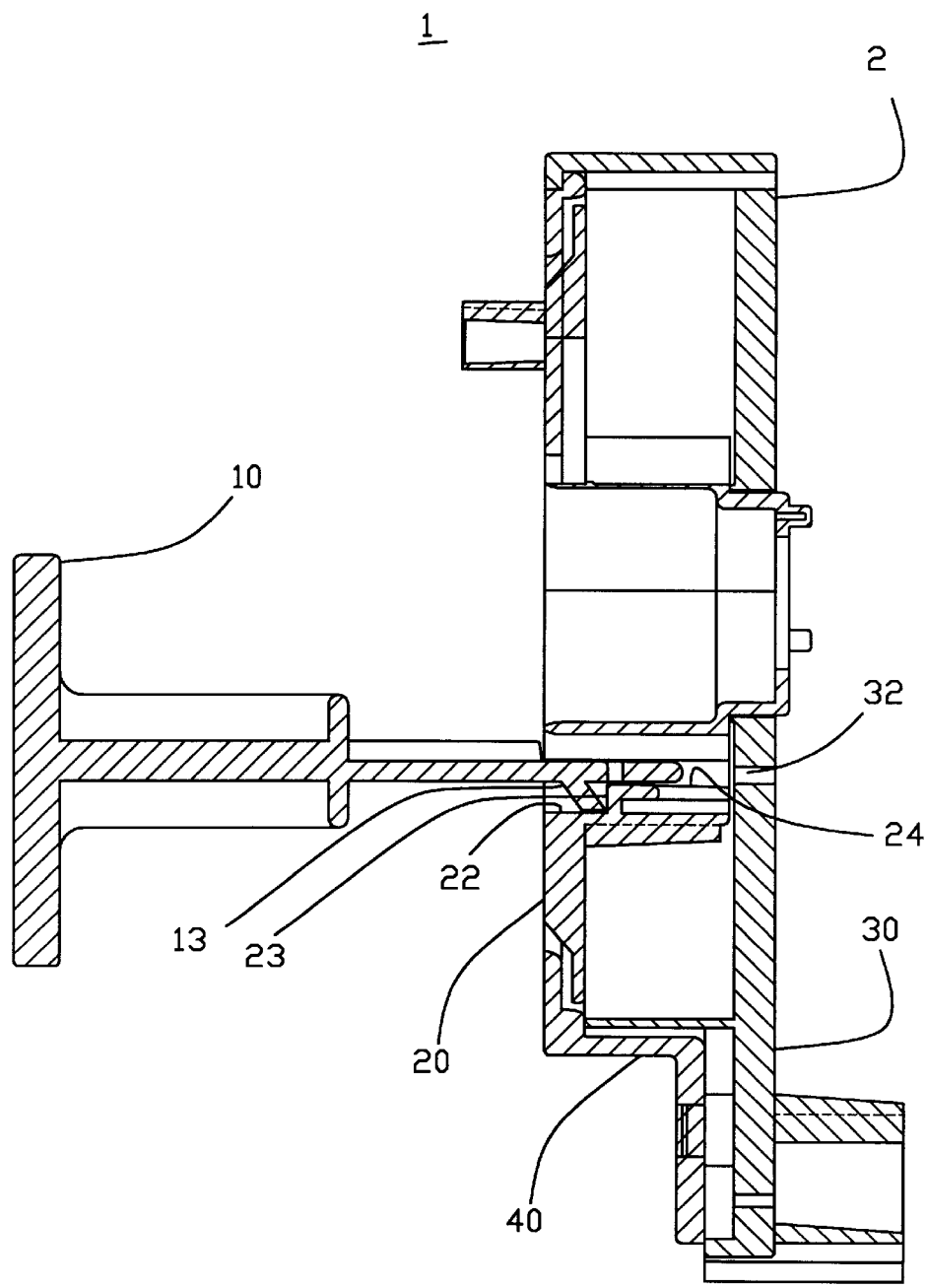
FIG. 5 is a cross-sectional side view of the key entering the clockspring.

FIG. 5 is a cross-sectional side view of the key 10 and clockspring 2. FIG. 5 shows the key 10 positioned within the second keyway 22 of the hub 20. The key 10 is prevented from being inserted further into the second keyway 22 since the protrusion 13 of the flexible tab 12 of the key 10 contacts the wall 23 of the hub 20.

Figure 6:
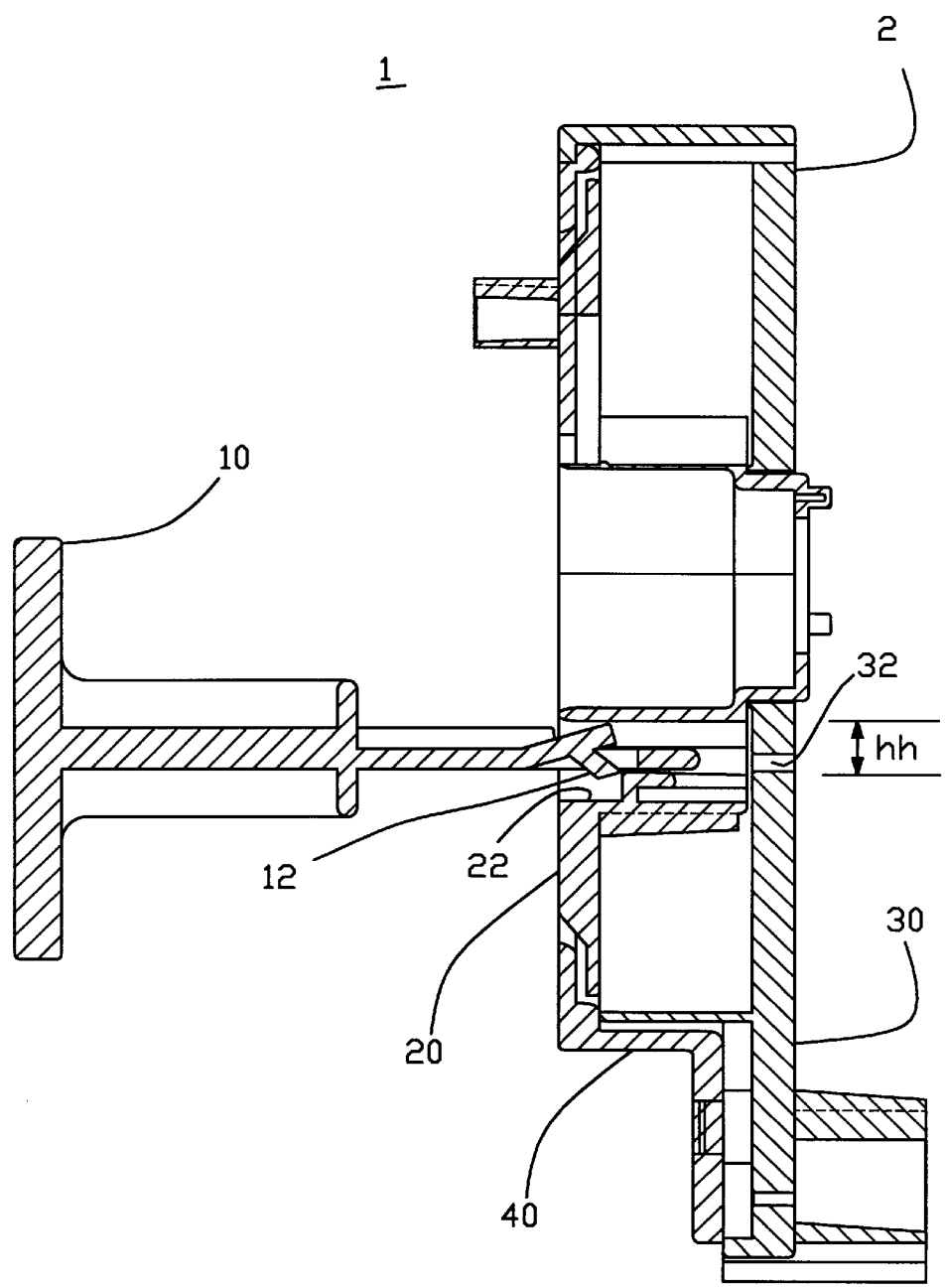
FIG. 6 is a cross-sectional side view as in FIG. 5 where the flexible tab of the key is shown in a deflected position.

In order for the key 10 to be further inserted into the second keyway 22 of the hub 20, the flexible tab 12 of the key 10 must be deflected as shown in FIG. 6. FIG. 6 is a cross-sectional side view of the key 10 and the clockspring 2. The second keyway 22 has a height hh. The height hk1 of the flexible tab 12 (see FIG. 2) is less than the height hh of the second keyway 22, as shown in FIG. 6. However, the height hk1 of the flexible tab 12 is substantially the same as the height hh of the second keyway 22 of the hub 20 so that it is difficult for the key 10 to be successfully inserted into the second keyway 22. The height hk2 of the rib 14 of the key 10 (see FIG. 2) is slightly less than the height hh of the second keyway 22.

Once the flexible tab 12 is deflected, the key 10 can be further inserted into the second keyway 22. To insert the key 10 all of the way into the second keyway 22 of the hub 20, the hub 20 must be rotated relative to the housing 30 so that the second keyway 22 is substantially coaxial with the first keyway 32 of the housing 30. Such a positioning of the hub 20 relative to the housing 30 allows the key 10 to be completely inserted into the clockspring 2 as shown in FIG. 8. Once the protrusion 13 of the flexible tab 12 travels past an indentation 26 of the hub 20, the flexible tab 12 of the key 10 springs back to its undeflected position as shown in FIG. 8. The slopping surface 15 of the protrusion 13 of the flexible tab contacts the indentation 26 of the hub 20 so that the key does not fall out of the first and second keyways 22, 32. However, the sloping surface 15 aids in the removal of the key 10 from the clockspring 2 at the time the clockspring 2 is to be mounted on the steering column of the vehicle, since the sloping surface 15 slides against the indentation 26 upon removal of the key 10. During removal of the key 10 from the clockspring 2, the sloping surface 15 contacts the indentation 26, where the sloping surface 15 slides against the indentation 26, as the key 10 is withdrawn, thus causing the flexible tab 12 to deflect so that the key 10 can be disengaged from the clockspring 2. The key 10 is disengaged from the clockspring 2 by a person squeezing the grip 19 of the key 10 with their fingers and then pulling the key 10 away from the clockspring 2.

Figure 7:
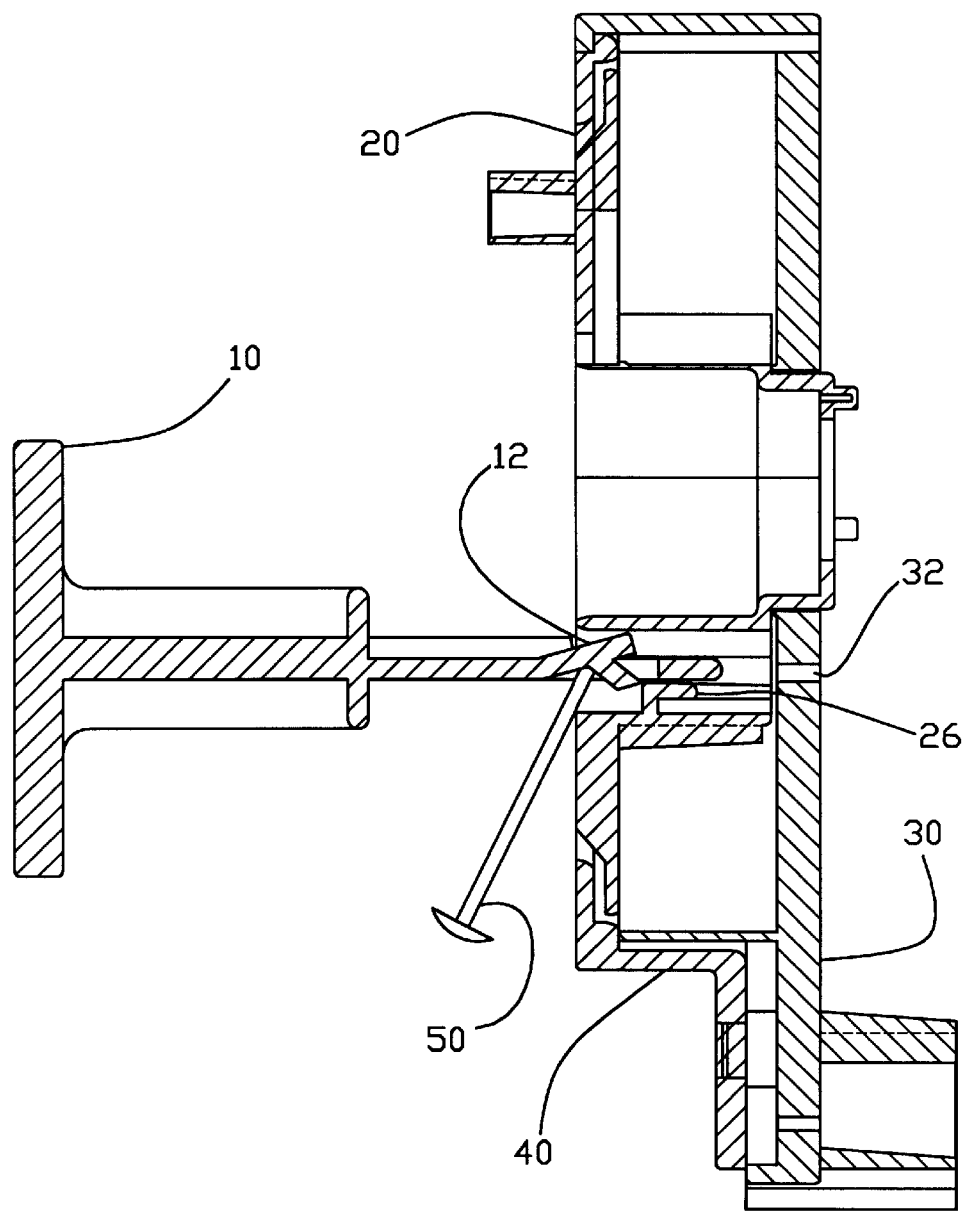
FIG. 7 is a cross-sectional side view, as in FIG. 6, where an insertion tool is used to deflect the flexible tab of the key.

During the insertion process, the preferred way of deflecting the flexible tab 12 of the key 10 is by pushing on the vertex 11 of the flexible tab 12 with an insertion tool 50 as shown in FIG. 7. Once the flexible tab 12 is deflected with the insertion tool 50, the insertion tool 50 and the key 10 move toward the clockspring 2 so that the key 10 can continue to be inserted into the clockspring 2, at which time the insertion tool 50 can be removed. The person who has possession of the insertion tool 50 is the person who has the skill, knowledge, and authority to insert the key 10. Thus, there is control over who can insert or re-insert the key 10 into the clockspring 2.

Figure 9:
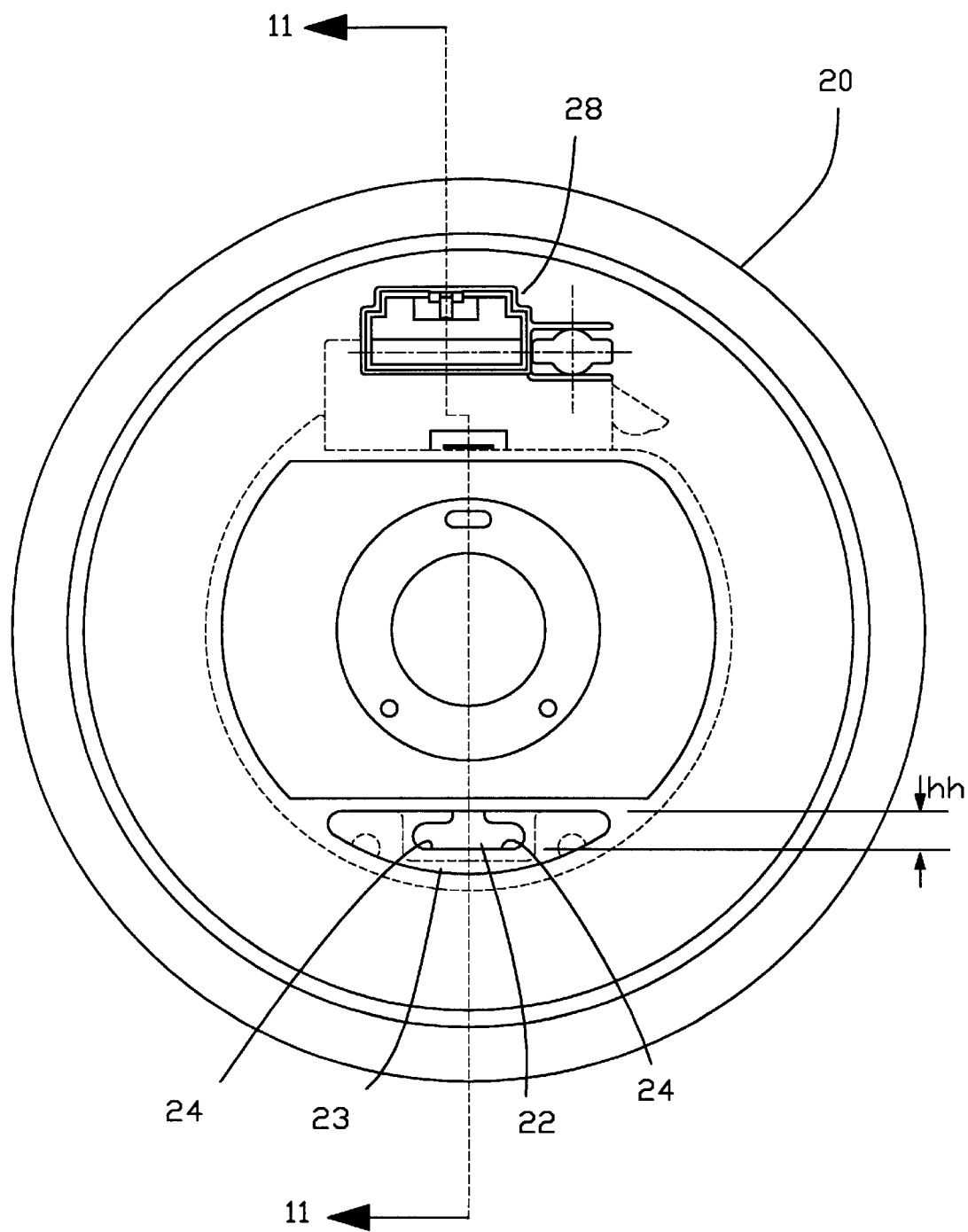
FIG. 9 is a top view of the hub.

FIG. 9 is a top view of the hub 20 showing the hub terminal 28 and the second keyway 22. The second keyway 22 has edge portions 24. The edge portions 24 support and guide the side portions 18 (see FIG. 1) of the key 10 as it is inserted into the second keyway 22. The height hh of the entrance of the second keyway 22 is shown in FIG. 9.

Figure 10:
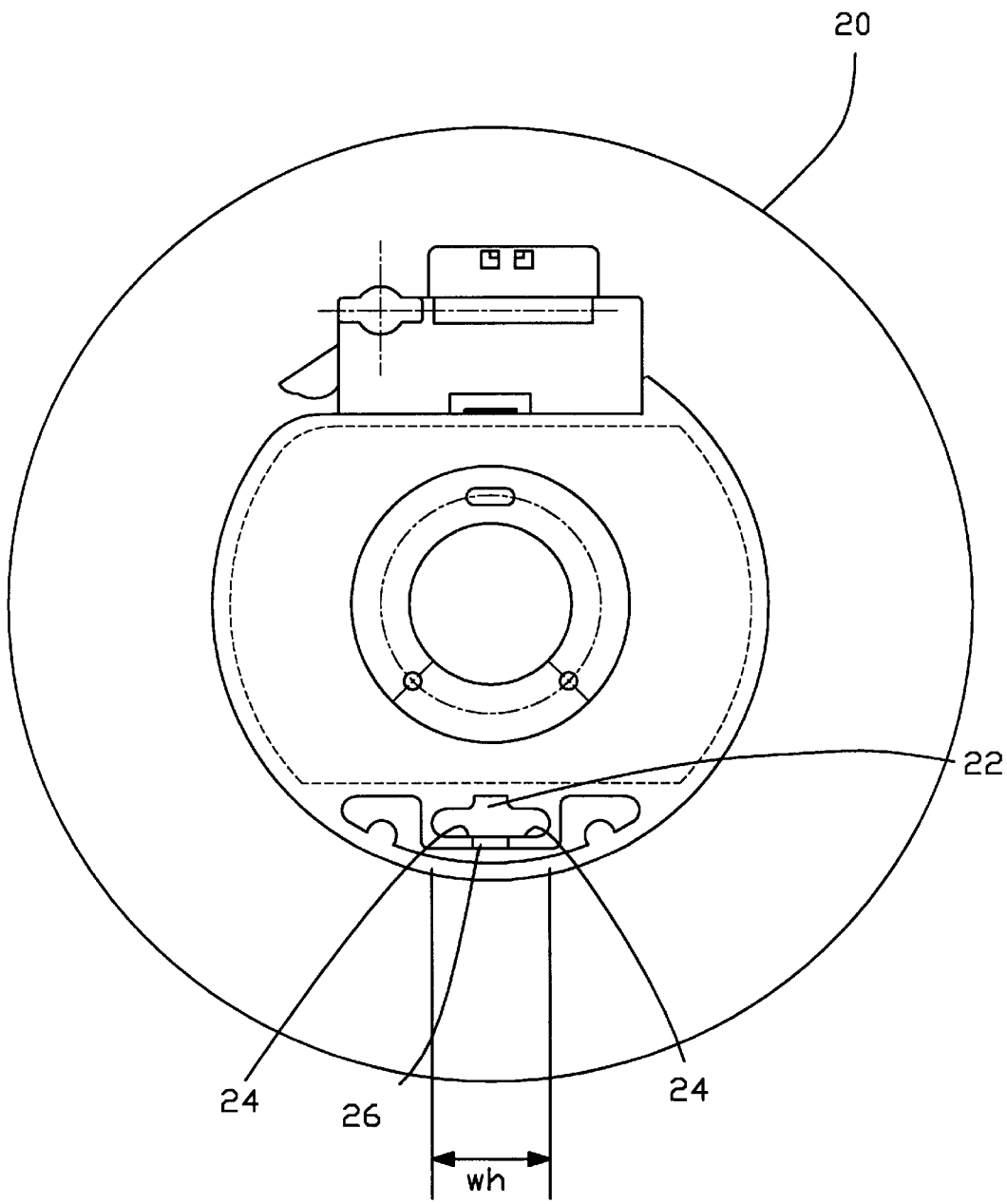
FIG. 10 is a bottom view of the hub.

FIG. 10 is a bottom view of the hub 20 showing the indentation 26 of the second keyway 22. FIG. 10 shows a width wh of the second keyway 22 of the hub 20. The width wh of the second keyway 22 of the hub 20 is slightly greater than the width wk of the key 10 (see FIG. 1).

Figure 11:
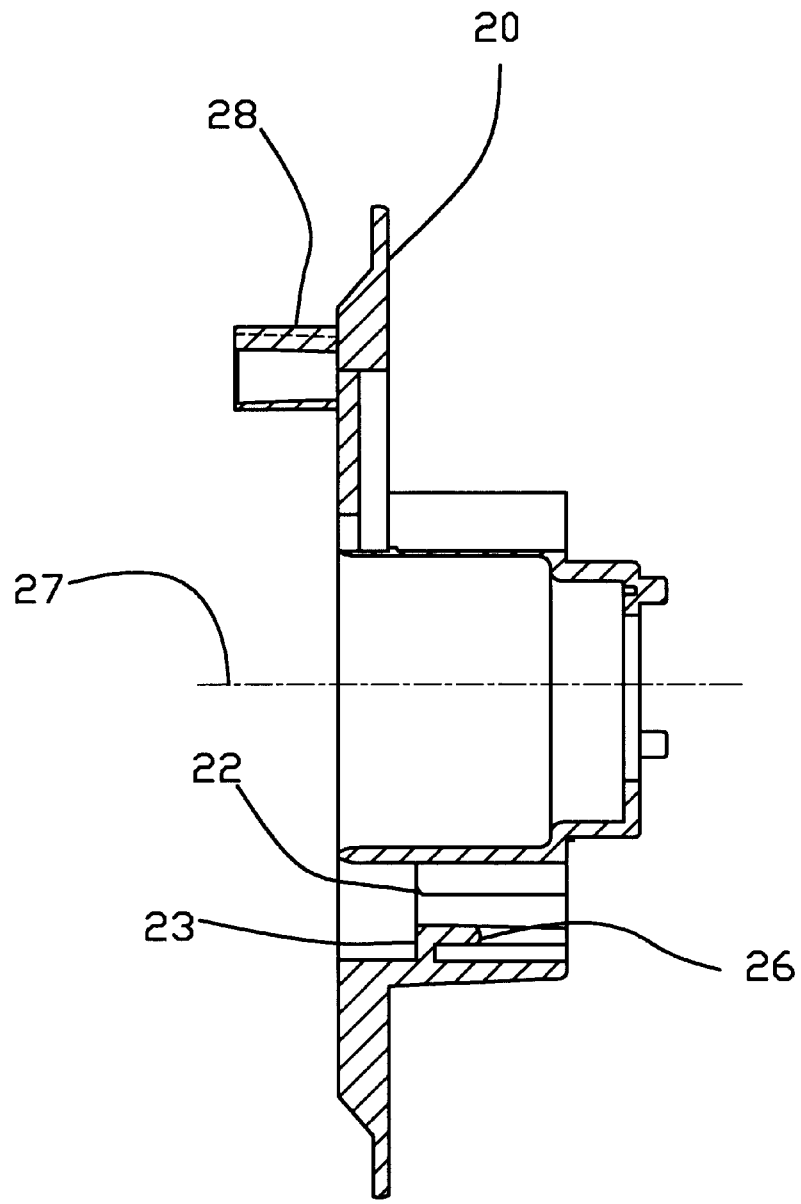
FIG. 11 is a cross-sectional side view of the hub taken along section line 11—11 of FIG. 9.

FIG. 11 is a cross-sectional side view of the hub 20 taken along section line 11—11 of FIG. 9. FIG. 11 shows the hub terminal 28, the axis of rotation 27 of the hub 20, and the indentation 26 of the second keyway 22.

Figure 12:
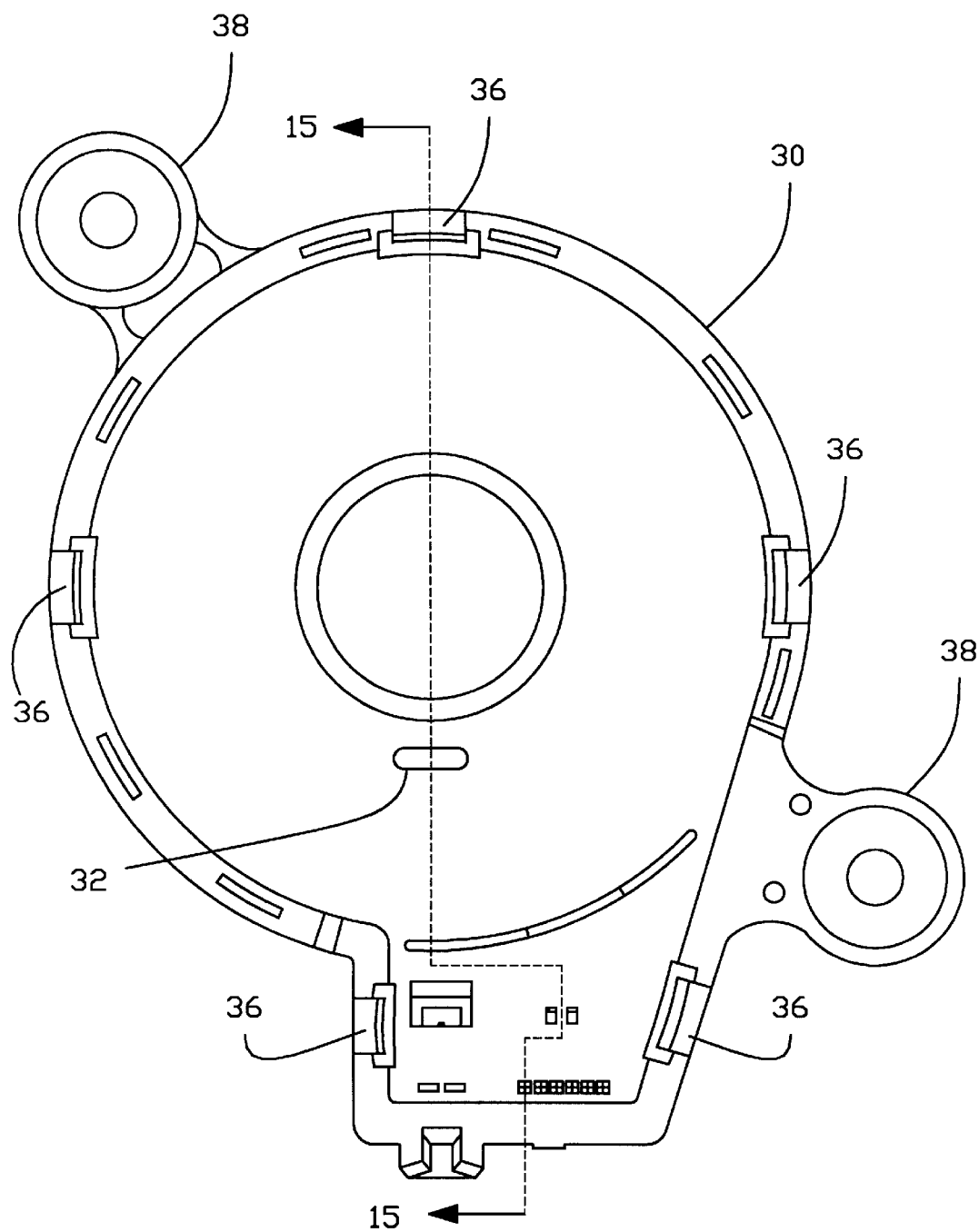
FIG. 12 is a top view of the housing.

FIG. 12 is a top view of the housing 30 showing the first keyway 32, the mounting bosses 38, and the mounting fingers 36. As shown in FIG. 8, the extension 16 of the key 10 fits into the first keyway 32. Also, shown, as in FIG. 3, is the connection between the mounting surfaces 42 of the cover 40 and the mounting fingers 36 of the housing.

Figure 13:
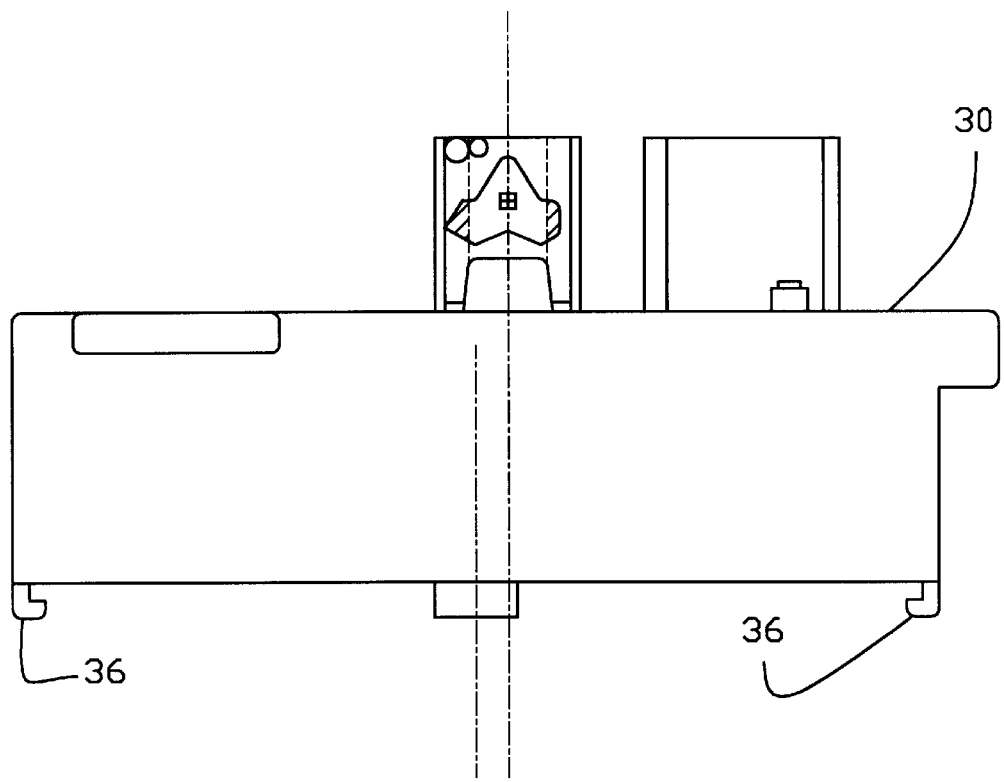
FIG. 13 is a side view of the housing.

FIG. 13 is a side view of the housing 30 showing the mounting fingers 36.

Figure 14:
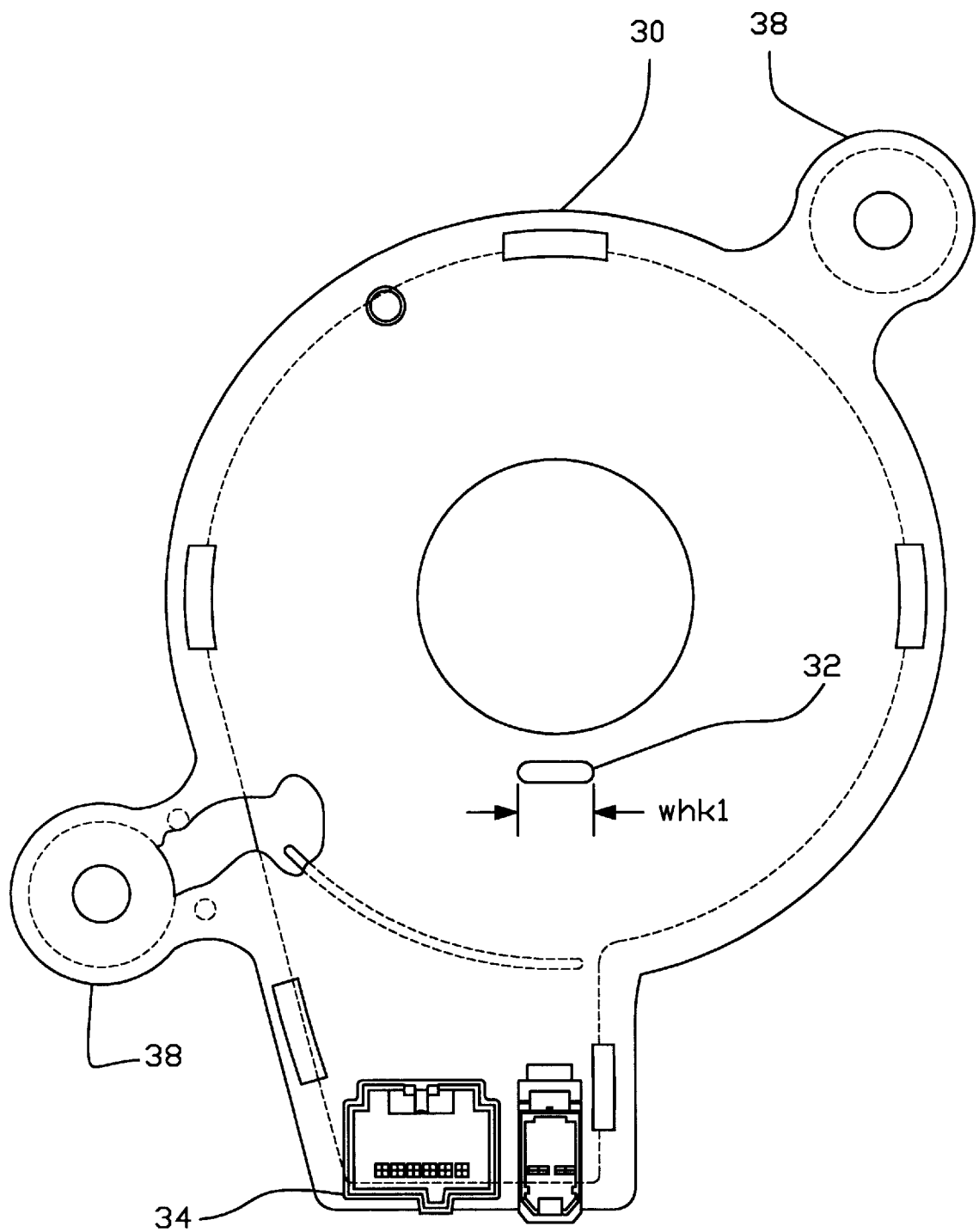
FIG. 14 is a bottom view of the housing.

FIG. 14 is a bottom view of the housing 30 displaying the housing terminal 34, the first keyway 32, and mounting bosses 38. The mounting bosses 38 are used to mount the clockspring 2 to the steering column. FIG. 14 also shows the width whk1 of the first keyway 32. The width whk1 of the first keyway 32 is slightly greater than the width wt of the extension 16 of the key 10 (see FIG. 1).

Figure 15:
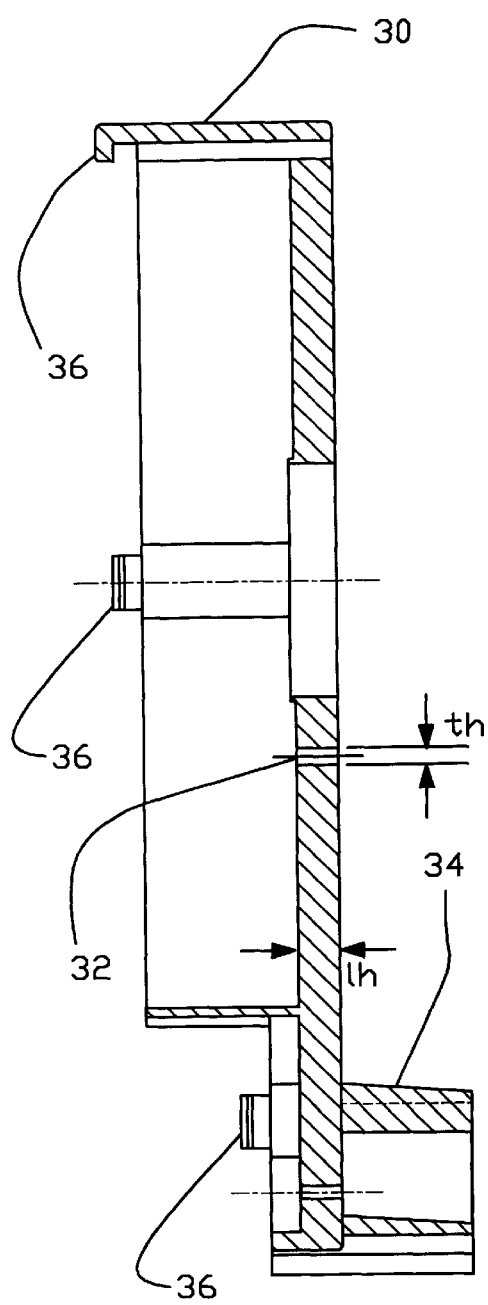
FIG. 15 is a cross-sectional side view of the housing taken along section line 15—15 of FIG. 12.

FIG. 15 is cross-sectional view of the housing 30 taken along section line 15—15 of FIG. 12. FIG. 15 displays mounting fingers 36, the first keyway 32, and the housing terminal 34. FIG. 15 also shows a thickness th of the first keyway 32. The thickness th of the first keyway 32 is slightly greater than the thickness tk of the extension 16 of the key 10 (see FIG. 2). FIG. 15 also shows a wall thickness lh of the housing 30.

To ensure that the key 10 engages the first keyway 32 of the housing 30, the length lk of the extension 16 of the key 10 (see FIG. 1) is substantially the same as the housing wall thickness lh of the housing 30. The length lk of the extension 16 is measured from the free end of the extension 16 to a shoulder 17 of the key 10. In practice, once the key 10 is installed in the clockspring 2, the shoulders 17 can contact the housing 30 so as to prevent the key 10 from being further inserted into the clockspring 2.

Figure 16:
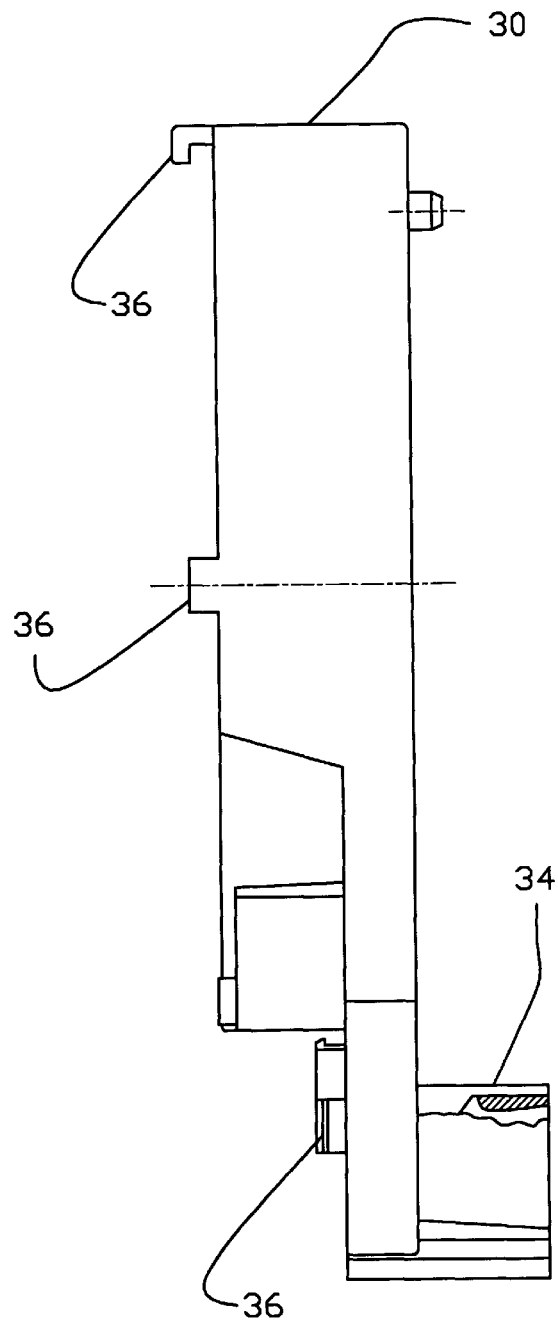
FIG. 16 is a partial cross-sectional side view of the housing taken along section line 15—15 of FIG. 12.

FIG. 16 is a side view of the housing 30 displaying a partial cross-section of the housing terminal 34, and mounting fingers 36.

Figure 17:
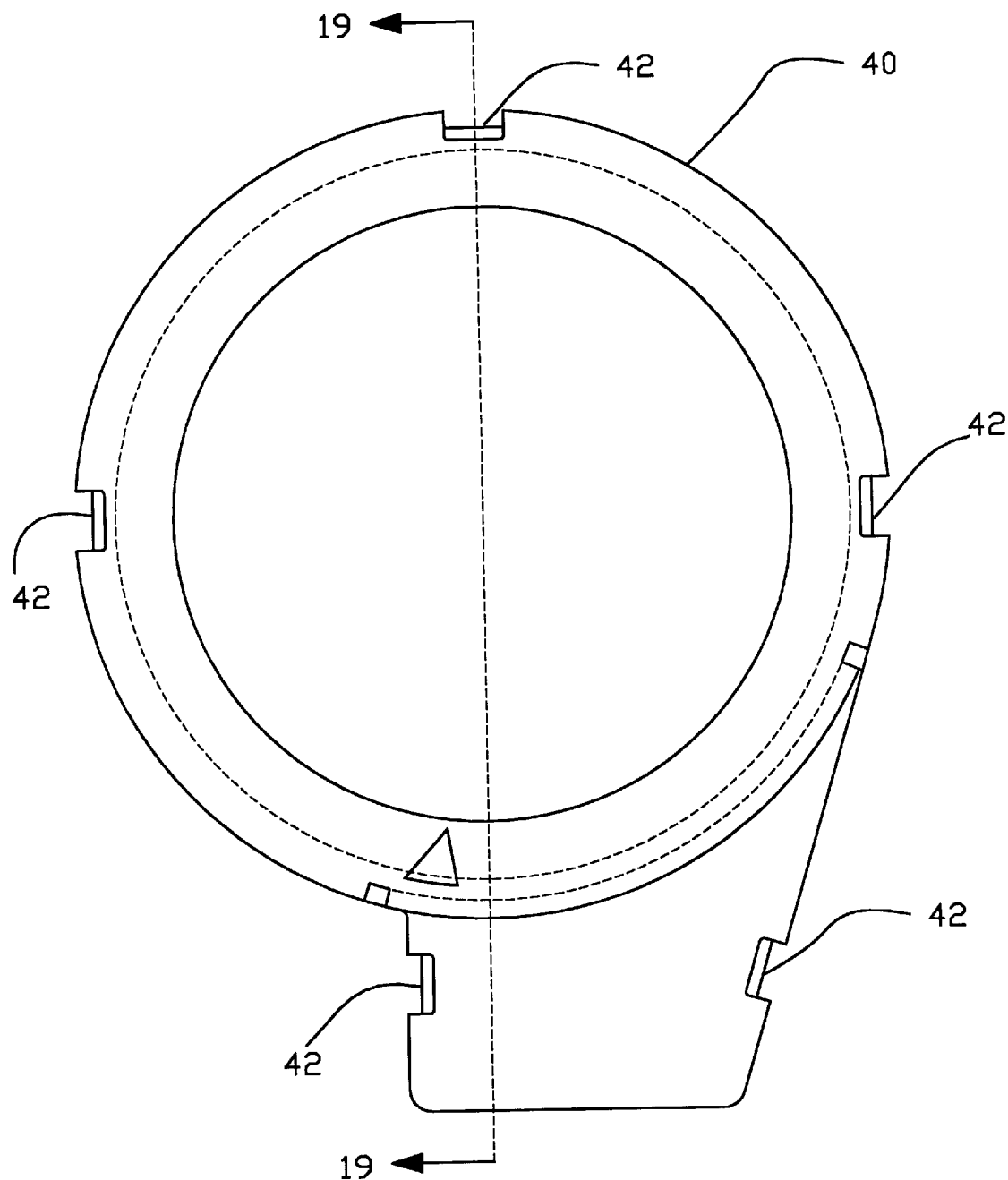
FIG. 17 is a top view of the cover.

FIG. 17 is a top view of the cover 40 showing the mounting surfaces 42.

Figure 18:
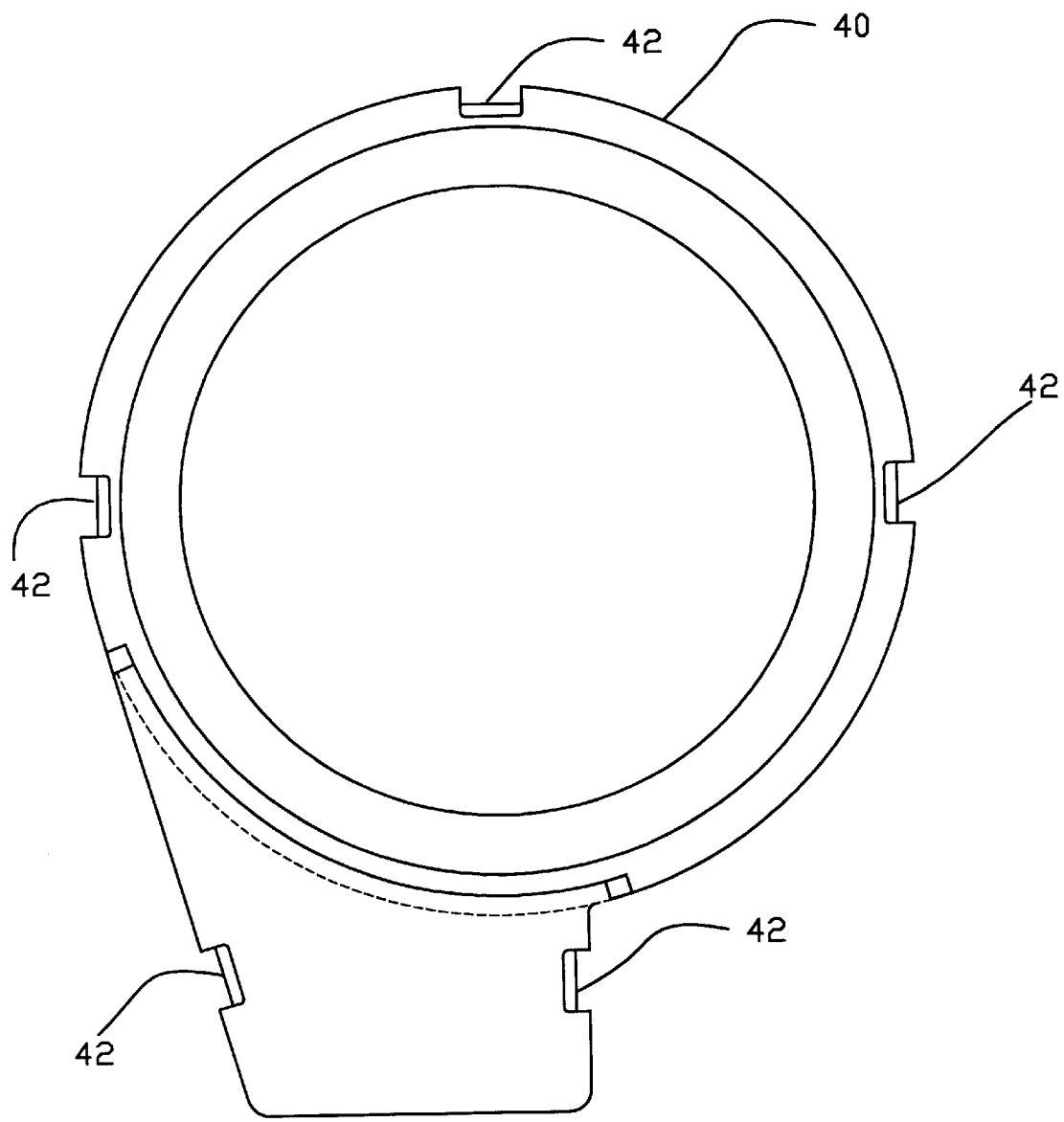
FIG. 18 is a bottom view of the cover.

FIG. 18 is a bottom view of the cover 40 showing the mounting surfaces 42.

Figure 19:
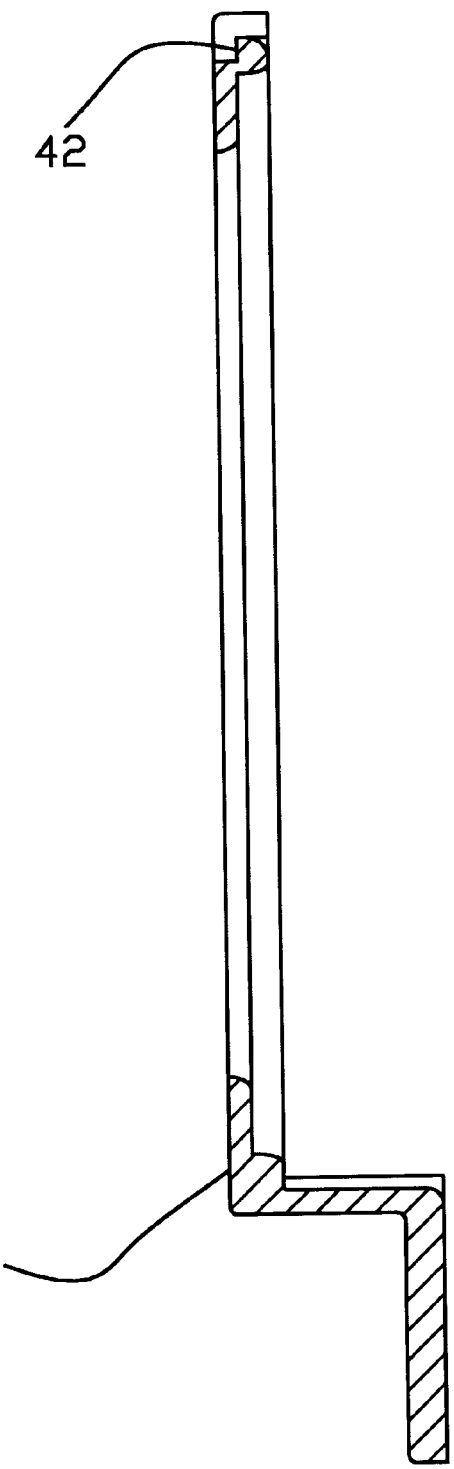
FIG. 19 is a cross-sectional view taken along section line 19—19 of FIG. 17.

FIG. 19 is a cross-sectional view of the cover 40 taken along section line 19—19 of FIG. 17.

In practice, the key 10 is not inserted into the clockspring 2 until the clockspring 2 has been adjusted to the mid-span of travel and where the first and second keyways 22 and 32 are substantially coaxial. The person who has authority to install the key 10 also has possession of the insertion tool 50. As discussed above, the insertion tool 50 is used to install the key 10 into the clockspring 2. Upon successfully inserting the key 10 into the clockspring 2, the assembled unit creates the external locking clockspring assembly 1, as shown in FIG. 8. The external locking clockspring assembly 1 can then be placed into inventory.

When the external locking clockspring assembly 1 is ready to be mounted on the steering column, the key 10 is removed from the external locking clockspring assembly 1, thus separating the key 10 from the clockspring 2. The clockspring 2 is then mounted onto the steering column by way of fasteners positioned through the mounting bosses 38 of the housing 30 (see FIG. 12). After removal from the external locking clockspring assembly 1, the key 10 can be discarded or stored for future use. Future use of a key 10 can include recycling of the key 10 by way of inserting the key 10 into a newly fabricated clockspring 2 or re-inserting the key 10 into a clockspring 2 removed from the steering column to facilitate repair work to the steering column.

Figure 20A:
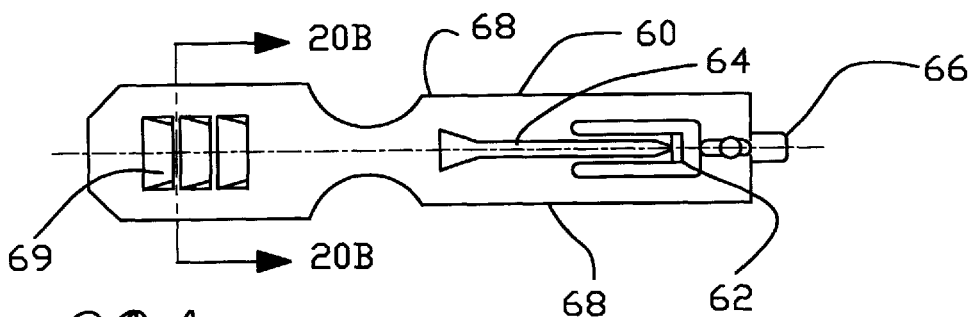
FIG. 20A is a top view of another embodiment of the key.
Figure 20B:
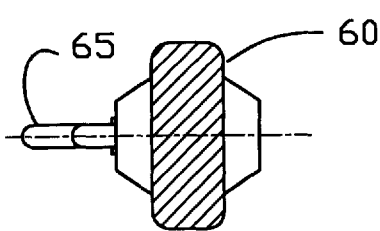
FIG. 20B is a cross-sectional view of the key taken along section line 20B—20B of FIG. 20A.
Figure 20C:
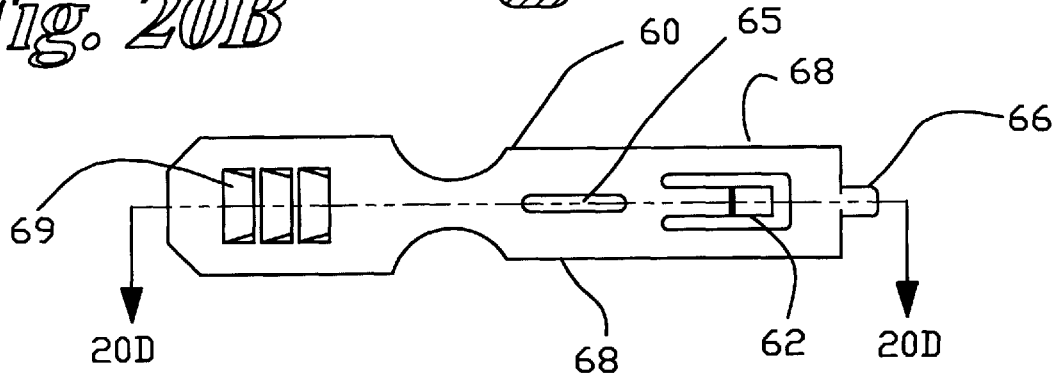
FIG. 20C is a bottom view of the key of FIG. 20A.
Figure 20D:
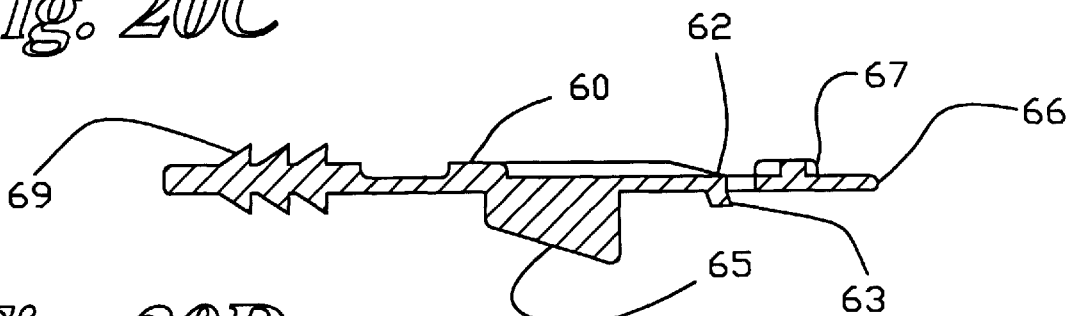
FIG. 20D is a cross-sectional view of the key taken along section line 20D—20D of FIG. 20C.
Figure 20E:
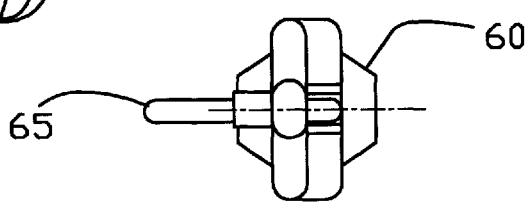
FIG. 20E is an end view of the key of FIG. 20A.

FIG. 20A shows a second embodiment of the key 60. FIG. 20B is a cross-sectional view of the key 60 taken along section line 20B—20B of FIG. 20A. FIG. 20C is a bottom view of the key 60. FIG. 20D is a cross-sectional view of the key 60 taken along section line 20D—20D of FIG. 20C. FIG. 20E is an end view of the key 60. The second embodiment of the key 60 includes a flexible tab 62, a protrusion 63 on the flexible tab 62, a first rib 64, a second rib 65, an extension 66, a third rib 67, side portions 68, and a grip 69. The difference between the key 10 and the key 60 is the inclusion of the second and third ribs 65, 67 on the key 60. The addition of the second and third ribs 65, 67 makes the key 60 stiffer than the key 10. The use and purpose of the second embodiment of the key 60 is the same as the use and purpose of the first embodiment of the key 10 as described above.

Figure 21A:
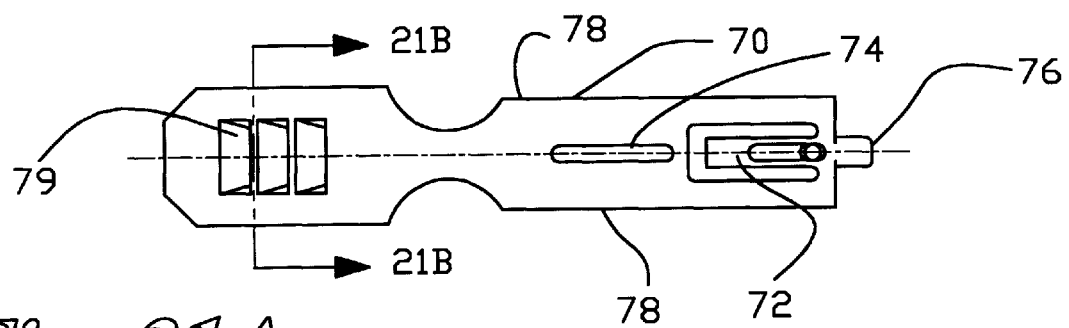
FIG. 21A is a top view of still another embodiment of the key.
Figure 21B:
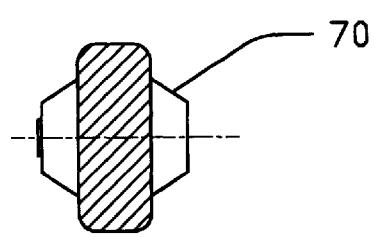
FIG. 21B is a cross-sectional view of the key taken along section line 21B—21B of FIG. 21A.
Figure 21C:
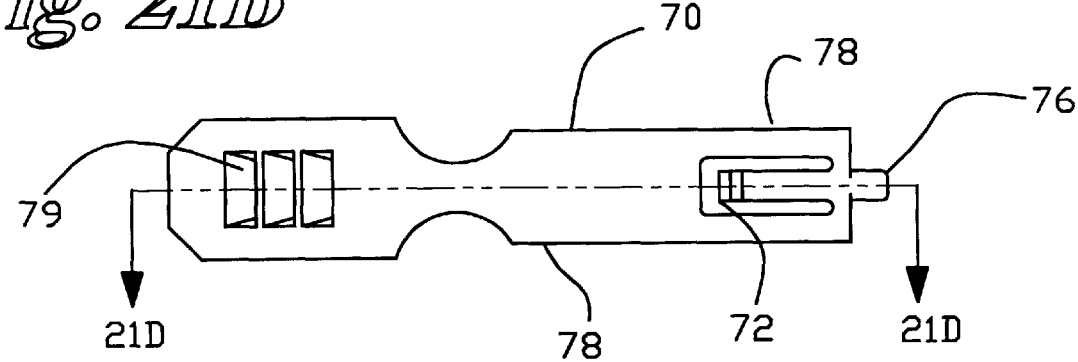
FIG. 21C is a bottom view of the key of FIG. 21A.
Figure 21D:
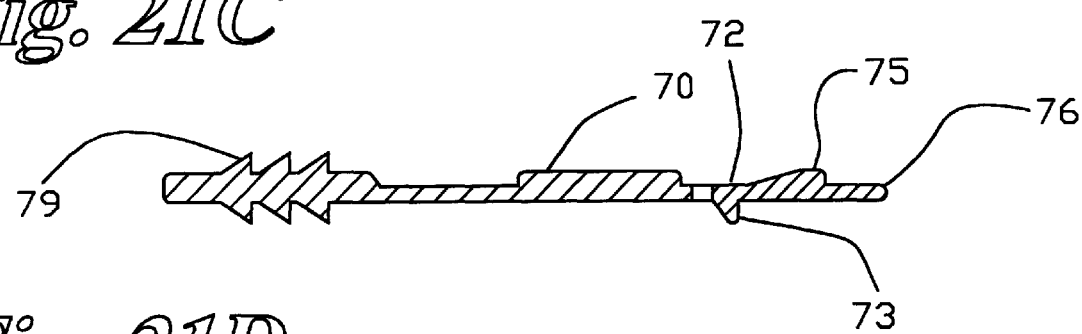
FIG. 21D is a cross-sectional view of the key taken along section line 21D—21D of FIG. 21C.
Figure 21E:
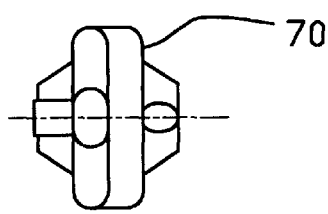
FIG. 21E is an end view of the key of FIG. 21A.

FIG. 21A shows a second embodiment of the key 70. FIG. 21B is a cross-sectional view of the key 70 taken along section line 21B—21B of FIG. 21A. FIG. 21C is a bottom view of the key 70. FIG. 21D is a cross-sectional view of the key 70 taken along section line 21D—21D of FIG. 21C. FIG. 21E is an end view of the key 70. The second embodiment of the key 70 includes a flexible tab 72, a protrusion 73 on the flexible tab 72, a first rib 74, a second rib 75, an extension 76, side portions 78, and a grip 79. The difference between the key 10 and the key 70 is the inclusion of the second rib 75 on the key 70 and the orientation of the flexible tab 72. The flexible tab 72 attaches to the key 70 one-hundred-eighty degrees in an opposite direction as compared to the attachment of the flexible tab 12 of key 10. The use and purpose of the third embodiment of the key 70 is the same as the use and purpose of the first embodiment of the key 10 as described above.

Obviously, numerous modifications and variations of the present invention are possible in light of the above teachings. It is therefore to be understood that within the scope of the appended claims, the invention may be practiced otherwise than as specifically described herein.

What is claimed is:

1. An external locking clockspring assembly comprising:
a housing having a first keyway;
a hub rotatably mounted in the housing, the hub having a second keyway; and
a removable key having a flexible tab, the key being insertable into the first and second keyways when the flexible tab is in a deflected position, the flexible tab being engagable with the hub when the flexible tab is in a non-deflected position, and wherein
in a locked position of the external locking clockspring assembly the first keyway being substantially coaxial with the second keyway, and wherein the key is inserted into both the first keyway and the second keyway, and the flexible tab engages the hub.

2. The external locking clockspring assembly of claim 1 wherein the flexible tab of the key has a protrusion, and wherein the second keyway of the hub has an indentation being complementary to the protrusion of the flexible tab of the key when the flexible tab of the key is in a non-deflected position.

3. The external locking clockspring assembly of claim 2, further comprising an insertion tool for deflecting the flexible tab of the key for making insertable the key into both the first keyway and the second keyway so that the external locking clockspring assembly is in the locked position.

4. The external locking clockspring assembly of claim 1 wherein the hub has an axis of rotation.

5. The external locking clockspring assembly of claim 4 wherein the first keyway of the housing has a length dimension substantially parallel to the axis of rotation of the hub.

6. The external locking clockspring assembly of claim 5 wherein the second keyway of the hub has a length dimension substantially parallel to the axis of rotation of the hub.

7. The external locking clockspring assembly of claim 1 wherein the key has side portions.

8. The external locking clockspring assembly of claim 7 wherein the second keyway of the hub has edge portions which are complementary to the side portions of the key.

9. The external locking clockspring assembly of claim 8 wherein the key has a rib so as to stiffen the key.

10. The external locking clockspring assembly of claim 9 wherein the key has an extension which fits into the first keyway when the external locking clockspring assembly is in the locked position.

11. The external locking clockspring assembly of claim 10 wherein the first keyway of the housing being complementary to the extension of the key.

12. The external locking clockspring assembly of claim 11 wherein the key has a grip.

13. The external locking clockspring assembly of claim 12 wherein the second keyway of the hub has an indentation being complementary to the flexible tab of the key when the flexible tab of the key is in a non-deflected position.

14. The external locking clockspring assembly of claim 13, further comprising an insertion tool for deflecting the flexible tab of the key for making insertable the key into both the first keyway and the second keyway so that the external locking clockspring is in the locked position.

15. The external locking clockspring assembly of claim 6 wherein the key has side portions.

16. The external locking clockspring assembly of claim 15 wherein the second keyway of the hub has edge portions which are complementary to the side portions of the key.

17. The external locking clockspring assembly of claim 16 wherein the key has a rib so as to stiffen the key.

18. The external locking clockspring assembly of claim 17 wherein the key has an extension at a free end of the key, wherein the extension fits into the first keyway when the external locking clockspring assembly is in the locked position.

19. The external locking clockspring assembly of claim 18 wherein the first keyway of the housing being complementary to the extension of the key.

20. A method of producing an external locking clockspring assembly comprising the steps of:

mounting a hub in a housing, the housing having a first keyway and the hub having a second keyway;

rotating the hub relative to the housing so that the second keyway of the hub is substantially coaxial with the first keyway of the housing;

deflecting a flexible tab of a removable key with an insertion tool; and inserting the key into both the first keyway and the second keyway so that the flexible tab engages the hub, whereby the hub is locked from rotating relative to the housing.

* * * * *